(12) United States Patent
Taylor et al.

(10) Patent No.: US 9,999,241 B2
(45) Date of Patent: Jun. 19, 2018

(54) CONVEYOR BELT SEAL

(71) Applicant: FORMAX, INC., Mokena, IL (US)

(72) Inventors: Paul Roger Taylor, Munster, IN (US);
Kurt Thomas Schauwecker, Chicago, IL (US)

(73) Assignee: FORMAX, INC., Mokena, IL (US)

( * ) Notice: Subject to any disclaimer, the term of this patent is extended or adjusted under 35 U.S.C. 154(b) by 0 days. days.

(21) Appl. No.: 14/829,913

(22) Filed: Aug. 19, 2015

(65) Prior Publication Data

US 2016/0060048 A1 Mar. 3, 2016

Related U.S. Application Data

(60) Provisional application No. 62/042,985, filed on Aug. 28, 2014.

(51) Int. Cl.
*B65G 15/42* (2006.01)
*A23P 1/10* (2006.01)
*A22C 7/00* (2006.01)
*B65G 45/12* (2006.01)
*B65G 21/20* (2006.01)

(52) U.S. Cl.
CPC ............ *A23P 1/105* (2013.01); *A22C 7/0076* (2013.01); *B65G 15/42* (2013.01); *B65G 21/2081* (2013.01); *B65G 45/12* (2013.01)

(58) Field of Classification Search
CPC .......................... B65G 15/42; B65G 21/2081
See application file for complete search history.

(56) References Cited

U.S. PATENT DOCUMENTS

| 2,665,795 | A | * | 1/1954 | Holwick | ............ | B65G 21/2081 |
| | | | | | | 198/830 |
| 2,836,285 | A | | 5/1958 | Muller | | |
| 3,059,758 | A | | 10/1962 | Walker | | |
| 3,343,652 | A | | 9/1967 | Thomson | | |
| 4,140,217 | A | * | 2/1979 | Dell | .................... | B65G 21/2081 |
| | | | | | | 198/636 |
| RE30,096 | E | | 9/1979 | Richards | | |
| 4,832,498 | A | * | 5/1989 | Milek | ................. | B01F 7/00158 |
| | | | | | | 366/186 |
| 4,899,872 | A | | 2/1990 | Hokao | | |

(Continued)

FOREIGN PATENT DOCUMENTS

GB 1066422 A 4/1967

OTHER PUBLICATIONS

International Search Report for International Application No. PCT/US2015/045855 dated Nov. 3, 2015, 2 pages.

(Continued)

*Primary Examiner* — Ryan Ochylski
(74) *Attorney, Agent, or Firm* — Klintworth & Rozenblat IP LLP

(57) ABSTRACT

A conveyor belt is formed from a loop of material having opposite first and second side edges, and which when laid flat has opposite planar surfaces extending between the first and second edges. First and second sealing protrusions extend outwardly from the outer surface of the loop of material and extending continuously around the outer surface of the loop of material. In use, the sealing protrusions contact a hopper of a food patty forming machine to prevent the leakage of food material from the hopper.

25 Claims, 11 Drawing Sheets

(56) References Cited

U.S. PATENT DOCUMENTS 7,210,923 B2  5/2007  Pasek et al.
2008/0233228 A1* 9/2008 Lindee ................. A22C 7/0038
425/144

OTHER PUBLICATIONS

Written Opinion of the International Searching Authority for International Application No. PCT /US2015/045855 dated Nov. 3, 2015, 5 pages.
International Preliminary Report on Patentability for International Application No. PCT /US2015/045855 dated Mar. 9, 2017, 7 pages.

* cited by examiner

US 9,999,241 B2

CONVEYOR BELT SEAL

This application claims the domestic priority of U.S. Provisional Application Ser. No. 62/042,985, filed on Aug. 28, 2014, the contents of which is incorporated herein in its entirety.

FIELD OF THE DISCLOSURE

The present disclosure relates to sealing protrusions for sealing a conveyor belt to an associated member, and in particular sealing protrusions for sealing a conveyor belt to a hopper in a food patty forming machine to minimize food material leakage from the food patty forming machine.

BACKGROUND

Prior art food patty forming machines, for example, U.S. Pat. Nos. Re. 30,096 and 7,210,923, include a large food material storage hopper and its associated conveyor belt, that opens into the intake of a food pump system, which continuously pumps a moldable food material, such as ground beef, chicken, turkey, fish, or the like, under pressure, into a manifold connected to a cyclically-operable molding mechanism which forms the molded products. The manifold comprises a valving system for feeding the food material, still under relatively high pressure, into the molding mechanism.

In the prior art, the conveyor belt is not sealed to the hopper. The food material is deposited on the conveyor as a lump. As the food material settles on the conveyor belt, the food material may expand outwardly. As a result, the food material may leak out of the hopper at the intersection of the belt and the sides of the hopper, and may leak out of the hopper at the intersection of the hopper front and the conveyor belt.

SUMMARY

A conveyor belt is formed from a loop of material having opposite first and second side edges, and which when laid flat has opposite planar surfaces extending between the first and second edges. First and second sealing protrusions extend outwardly from the outer surface of the loop of material and extend continuously around the outer surface of the loop of material. In use, the sealing protrusions contact a hopper of a food patty forming machine to prevent the leakage of food material from the hopper.

A conveyor belt having sealing protrusions is provided herein which aids in minimizing, if not eliminating, this food leakage between the hopper and the conveyor belt.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosure, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENTS

Figure 1:
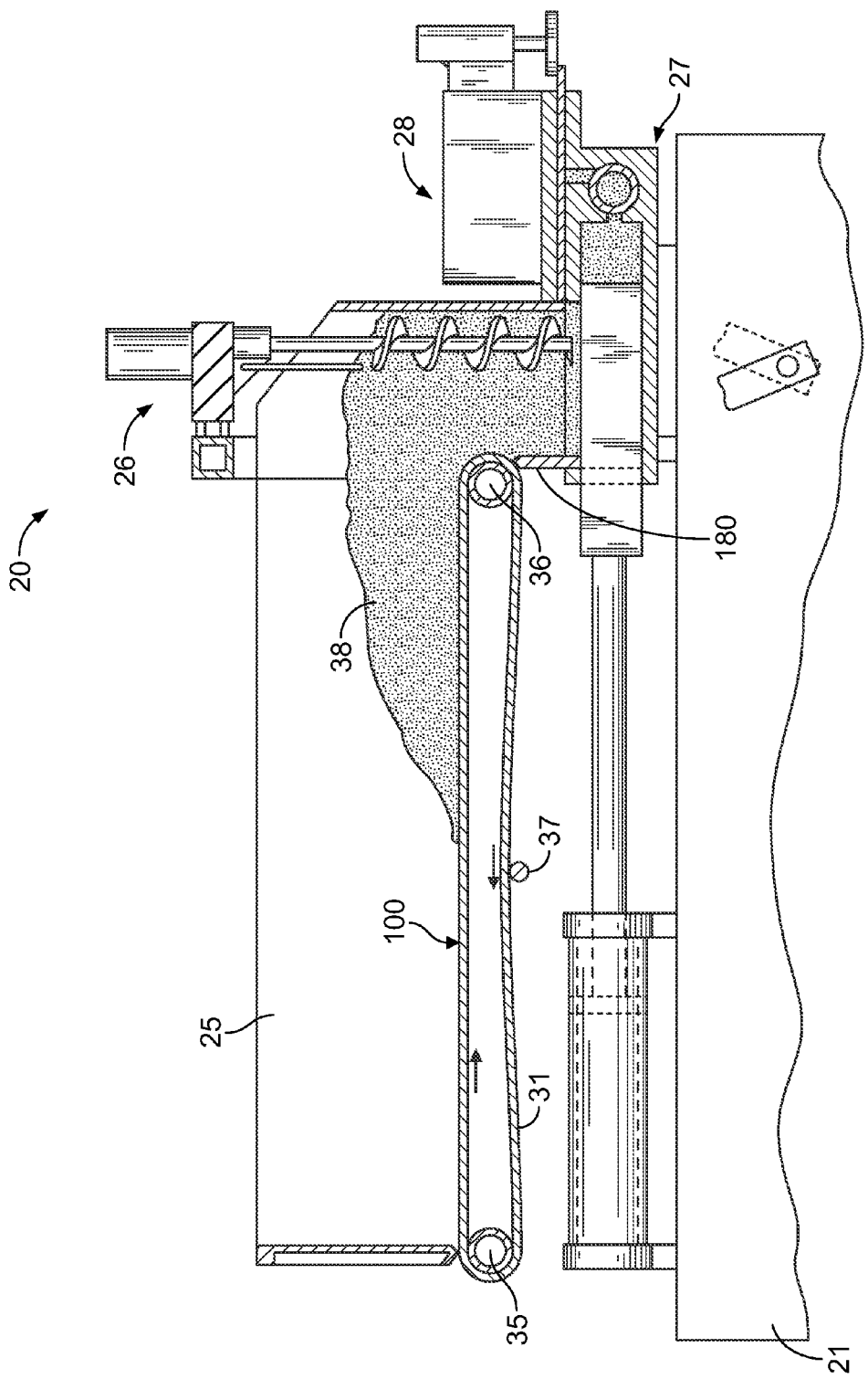
FIG. 1 is cross-sectional view of a food patty forming machine having a conveyor belt therein which incorporates the features of the present disclosure.

An improved conveyor belt assembly is provided and is used to form a seal with a large food material storage hopper of a high speed patty molding machine to prevent food material leakage between the conveyor belt assembly and the hopper. High speed patty molding machines are known in the art, for example, U.S. Pat. Nos. Re. 30,096 and 7,210,923, which disclosures are incorporated by reference in their entirety. While specific high speed patty molding machines are incorporated by reference herein, the improved conveyor belt assembly 100 of the present disclosure can be used with any patty molding machine which uses a conveyor belt and is not limited to the specific embodiments shown in the drawings or disclosed in U.S. Pat. Nos. Re. 30,096 and 7,210,923.

Figure 2:
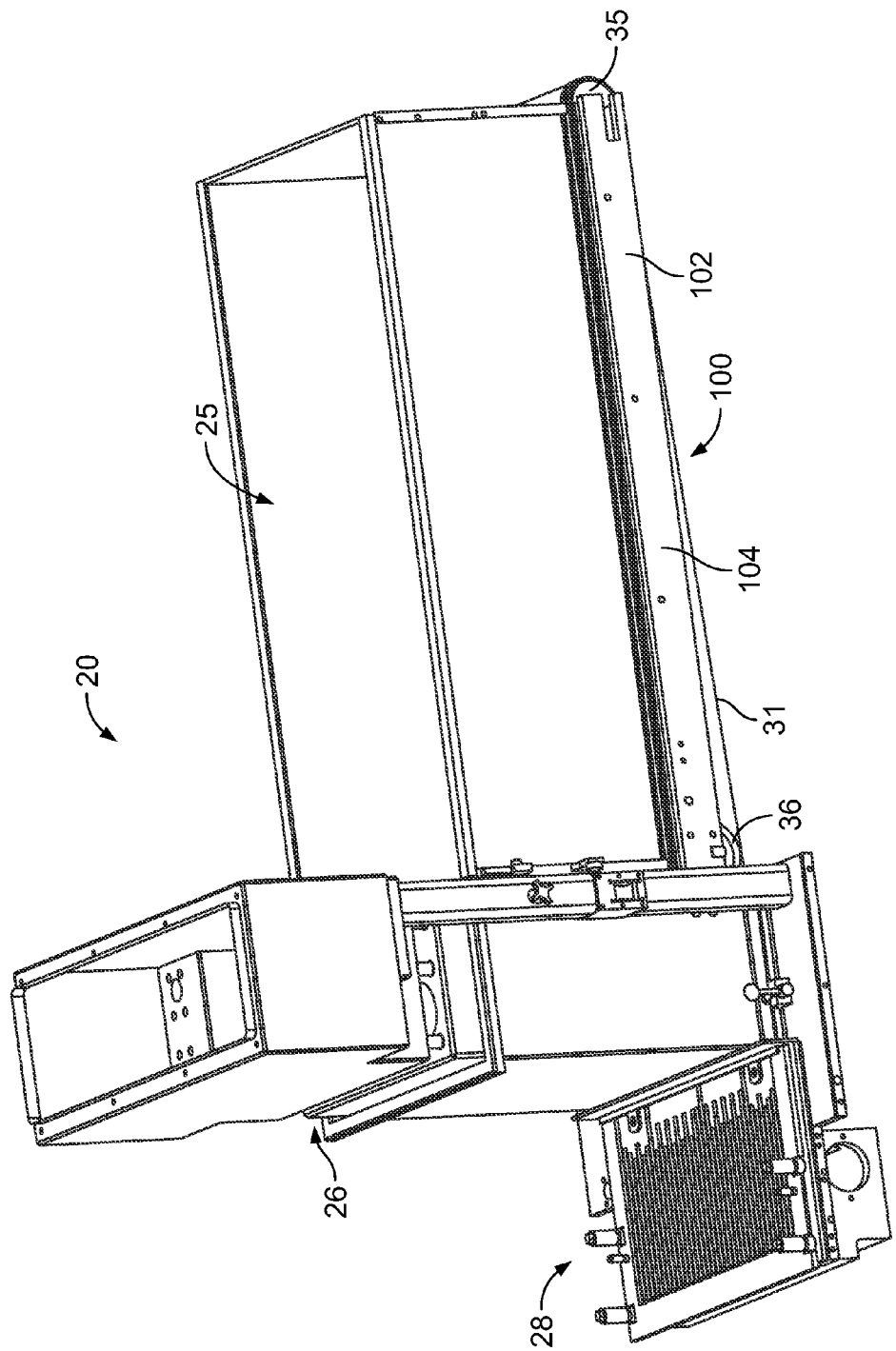
FIG. 2 is a top perspective view of the food patty forming machine.

In general, as shown in FIGS. 1 and 2, the high speed patty molding machine 20 includes a machine base 21, preferably mounted upon a plurality of rollers or wheels (not shown) which may rest upon a floor. Machine base 21 supports an operating mechanism for the molding machine 20, and contains hydraulic actuating systems, electrical actuating systems, and most of the machine controls. The molding machine 20 includes the hopper 25 and the conveyor belt assembly 100 of the present disclosure, that opens into the intake of a food pump system 26, such as is disclosed for example in the afore-mentioned patents, which continuously pumps a moldable food material 38, such as ground beef, chicken, turkey, fish, or the like, under pressure, into a manifold 27 of the food pump system 26 and which is connected to a cyclically-operable molding mechanism 28, such as is disclosed for example in the afore-mentioned patents. The manifold 27 comprises a known valving system for feeding the food material, still under relatively high pressure, into the molding mechanism 28 which forms the molded products.

As shown in the drawings, the conveyor belt assembly 100 of the present disclosure includes an elongated belt 31 forming a continuous loop of material which extends around an idler roller 35 at one end of the belt 31 and extends around a drive roller 36 at the other end of the belt 31, and a pair of elongated conveyor frames 102, 104 to which the rollers 35, 36 are rotationally mounted at the ends thereof. The belt 31 extends tightly around the rollers 35, 36, and a tensioning roller 37 may be provided. The frames 102, 104 are attached to the hopper 25 and the rollers 35, 36 are attached to the frames 102, 104. The belt 31 is positioned between the frames 102, 104 and forms the bottom wall of the hopper 25.

Each roller 35, 36 has a shaft around which a cylindrical roller rotates. A driver (not shown), such as a drum motor, is provided for rotating the drive roller 36, and thus the belt 31 which surrounds the rollers 35, 36.

Figure 4:
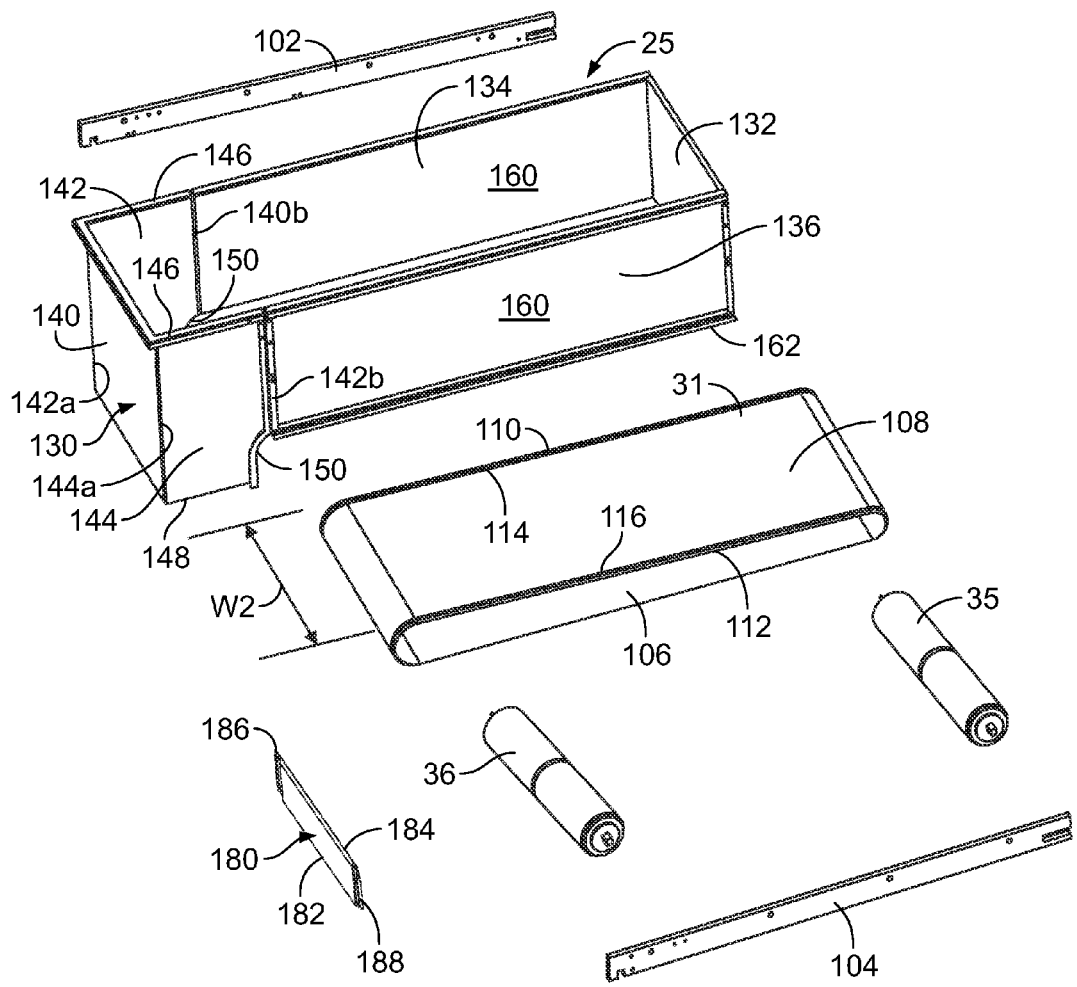
FIG. 4 is a top exploded perspective view of the hopper and conveyor belt assembly.
Figure 5:
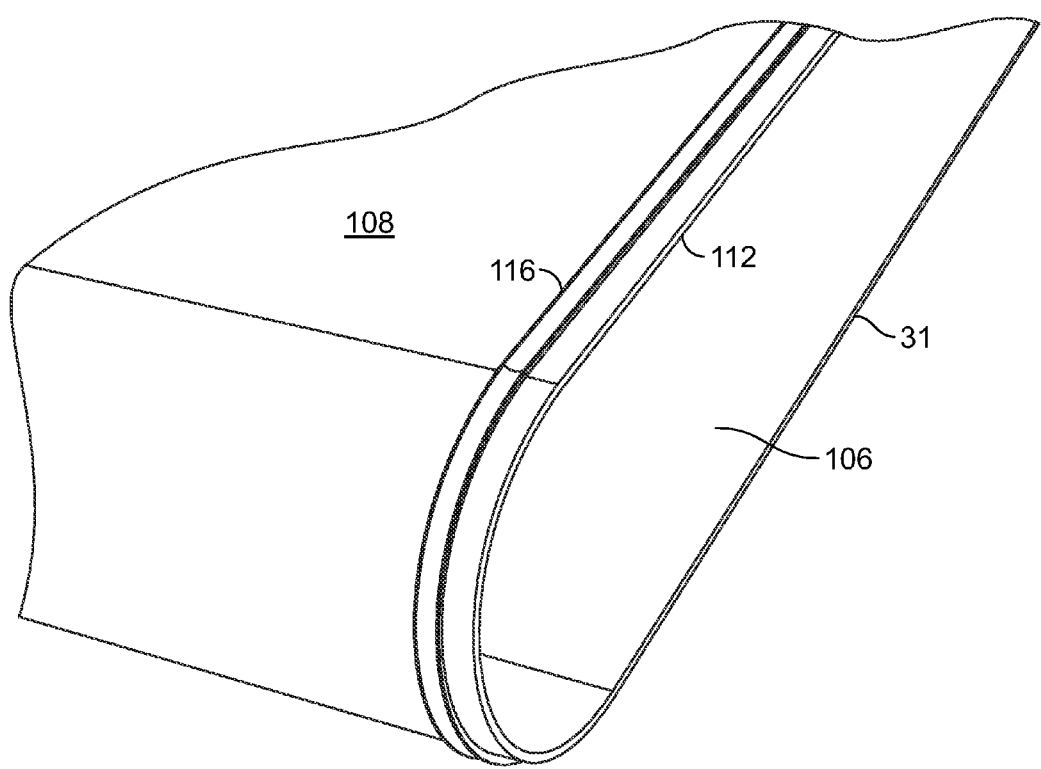
FIG. 5 is a top perspective view of the conveyor belt.

As shown in FIG. 4, the belt 31 has an inner surface 106, an opposite outer surface 108, and first and second side edges 110, 112. The belt 31 may have grooves, undulations, pockets which extend below the outer surface 108. If the belt 31 were laid flat, the inner surface 106 is planar and the outer surface 108 is planar (the grooves, undulations, pockets which extend below the outer surface 108 do not fall in the plane of the outer surface 108). A height H1 of the belt 31 is defined between the inner and outer surfaces 106, 108. The inner surface 106 of the belt 31 is in contact with the rollers 35, 36 and can include a longitudinal V-shaped rib (not shown) on an inside surface thereof that fits within a V-shaped cross sectional notch (not shown) provided on the rollers 35, 36 to maintain a lateral centering of the belt 31 during operation. Examples of suitable materials for the belt 31 include, but are not limited to nitrile, PVC, rubber, nylon, polyester, polyurethane, aramide, silicone, and copolyester.

As best shown in FIGS. 4-12, the belt 31 includes first and second sealing protrusions 114, 116 which extend outwardly from the outer surface 108 thereof and extend continuously around the outer surface 108 of the belt 31. That is, the first and second sealing protrusions 114, 116 extend around the circumference of the belt 31. The sealing protrusions 114, 116 have a width W1 which is substantially less than the width W2 of the belt 31. As best shown in FIG. 4, the first sealing protrusion 114 is proximate to, but preferably spaced from the first side edge 110 of the belt 31; the second sealing protrusion 116 is proximate to, but preferably spaced from the second side edge 112 of the belt 31.

FIGS. 6-12 show illustrative embodiments of sealing protrusions 114, 116.

Figure 6:
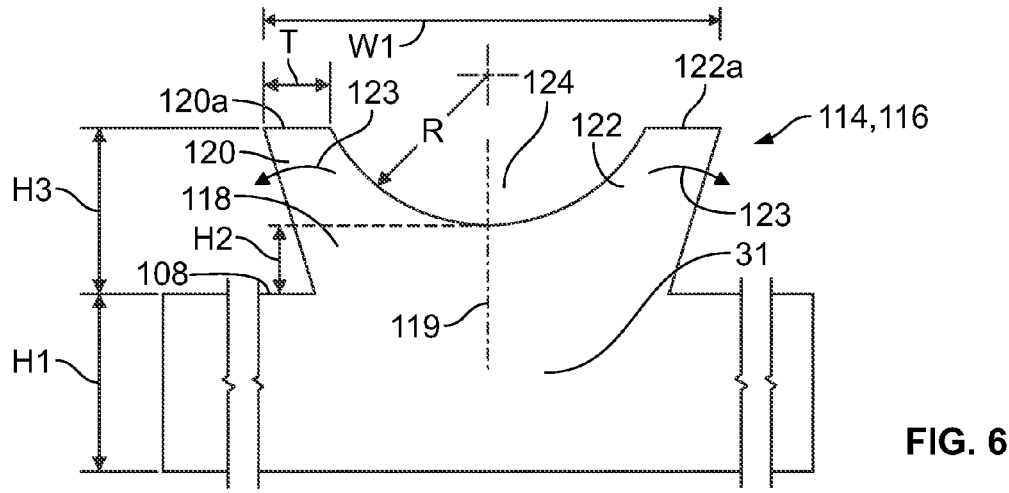
FIGS. 6-12 are cross-sectional views of the conveyor belt showing the loop of material and the sealing protrusions formed thereon.
Figure 7:
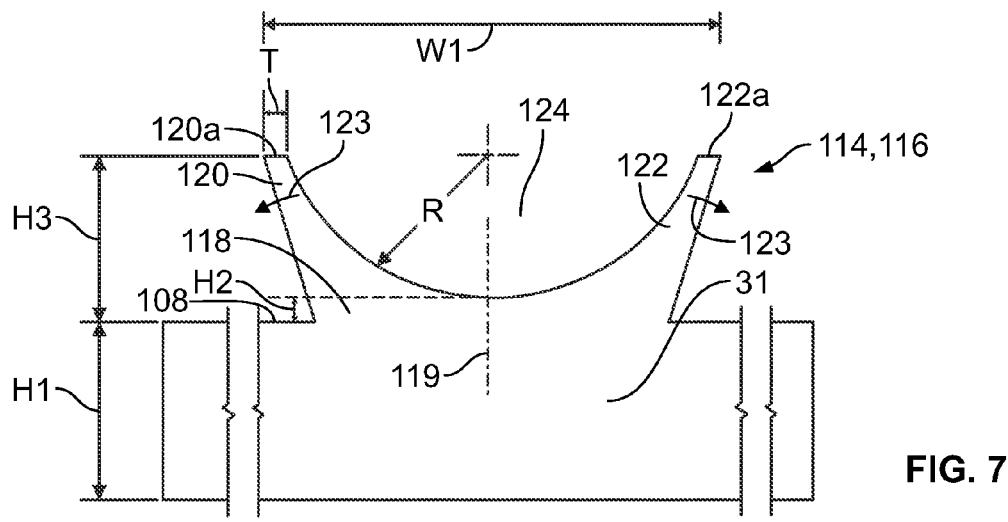
Figure 8:
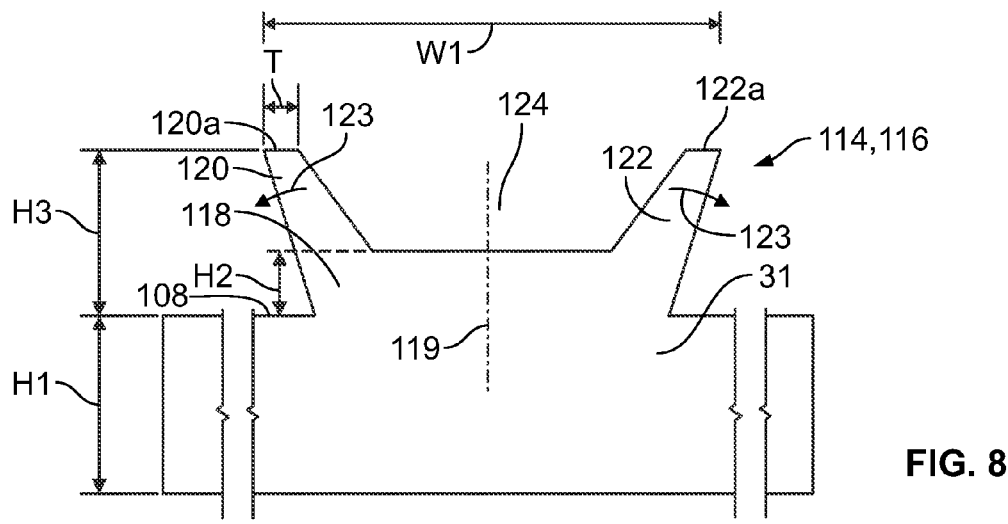

In the embodiments of FIGS. 6-8, the sealing protrusion 114, 116 has a base 118 from which a pair of spaced apart flexible legs 120, 122 extend. The base 118 extends outwardly from the belt 31 and the legs 120, 122 extend outwardly from the base 118. The legs 120, 122 are preferably angled relative to each other, and angle outwardly from a centerline 119 of the sealing protrusion 114, 116, the centerline 119 being perpendicular to the exterior surface 108 of the belt 31. In an embodiment, the legs 120, 122 angle outwardly from the centerline 119 at angle of 0 to 90 degrees. The base 118 and the legs 120, 122 form a recess 124 which extends continuously around the belt 31. The free ends of the legs 120, 122 form rubbing surfaces 120a, 122a. As shown in FIGS. 6-8, the base 118 of the different illustrative embodiments may have different heights H2 (the distance from the outer surface 108 of the belt 31 to the lowermost point of the recess 124) relative to the overall height H3 of the sealing protrusions 114, 116, and the rubbing ends 120a, 122a of the legs 120, 122 of the different illustrative embodiments may have different thicknesses T. In an embodiment, the height H3 of the sealing protrusions 114, 116 is approximately the same as the height H1 of the belt 31. Preferably, each leg 120, 122 flexes relative to the base 118, and preferably flexes outwardly relative to each other as shown by arrow 123. As shown in FIGS. 6-8, the recesses 124 may take a variety of shapes, such as radiused as shown in FIGS. 6 and 7, or trapezoidal as shown in FIG. 8, or any curved or linear combinations therefore resulting in a recess 124 having at least one leg 120 or 122. The different illustrative embodiments of FIGS. 6 and 7 show that the radii R forming the recesses 124 may vary. While two legs are shown and described, any number of legs, such as one, three, etc. may be provided.

Figure 9:
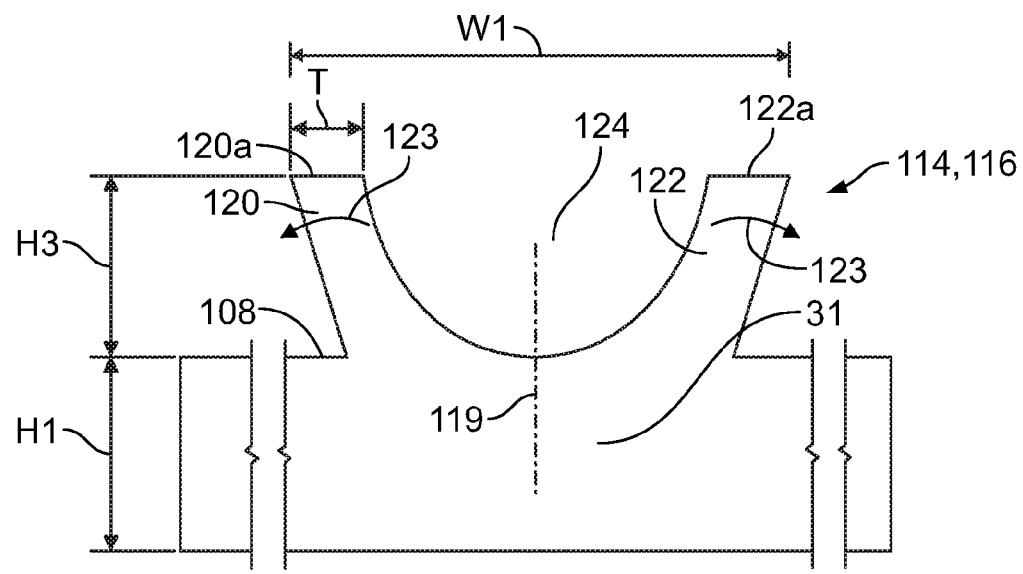
Figure 10:
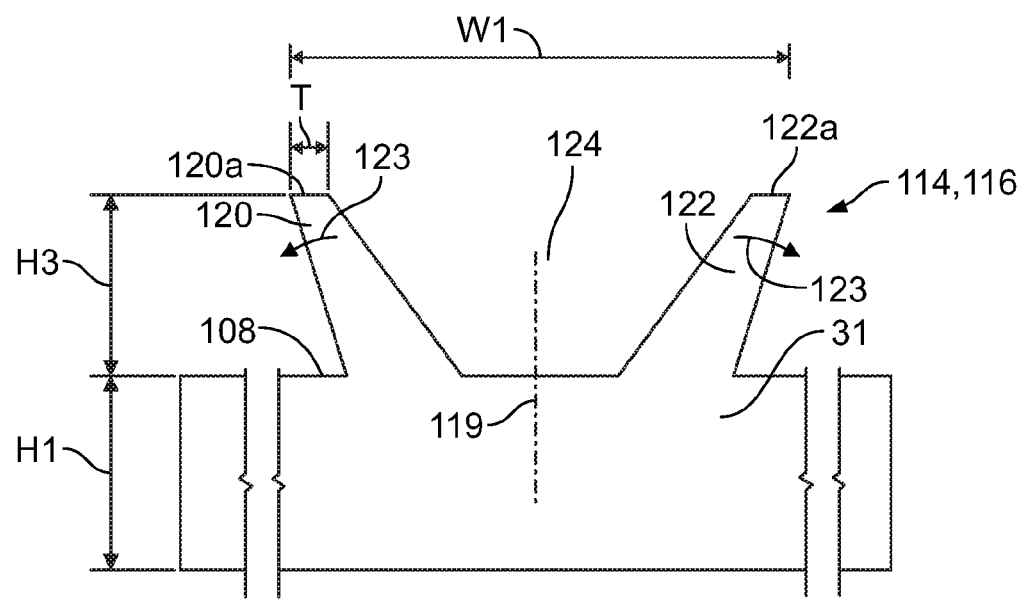

In the embodiments of FIGS. 9 and 10, the base 118 of FIGS. 6-8 has been eliminated. A pair of spaced apart flexible legs 120, 122 extend directly from the belt 31 and extend outwardly from the belt 31. The legs 120, 122 are preferably angled relative to each other, and angle outwardly from a centerline 119 of the sealing protrusion 114, 116. In an embodiment, the legs 120, 122 angle outwardly from the centerline 119 at angle of 0 to 90 degrees. The outer surface 108 and the legs 120, 122 form a recess 124 which extends continuously around the belt 31. The free ends of the legs 120, 122 form rubbing surfaces 120a, 122a. The overall height H3 of the sealing protrusions 114, 116 of the embodiments of FIGS. 9 and 10 is the same as the overall height H3 of the sealing protrusions 114, 116 of the embodiments of FIGS. 6-8. In an embodiment, the height H3 of the sealing protrusions 114, 116 is approximately the same as the height H1 of the belt 31. Preferably, each leg 120, 122 flexes relative to the belt 31, and preferably flexes outwardly relative to each other as shown by the arrows 123. As shown in FIGS. 9 and 10, the recesses 124 may take a variety of shapes, such as radiused as shown in FIG. 9, or trapezoidal as shown in FIG. 10, or any curved or linear combinations therefore resulting in a recess 124 having at least one leg 120 or 122. Like that of the illustrative embodiments of FIGS. 6 and 7, the radii forming the recess 124 may vary. While two legs are shown and described, any number of legs, such as one, three, etc. may be provided.

Figure 11:
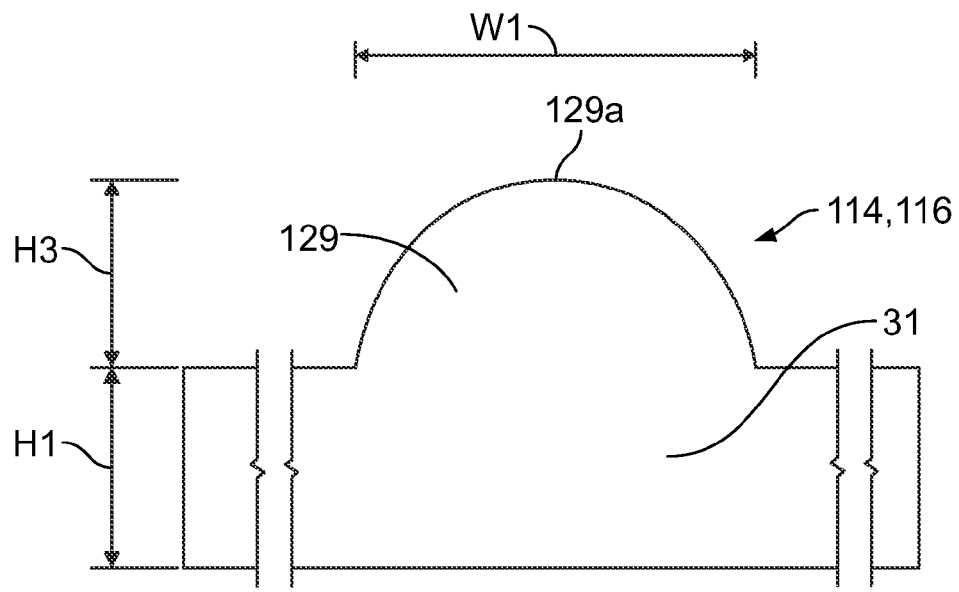
Figure 12:
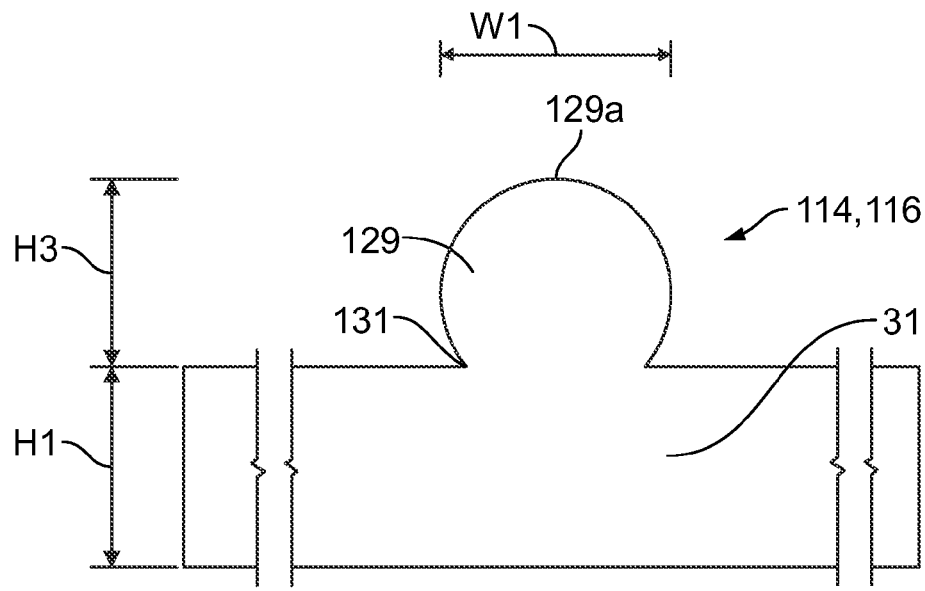

In the embodiments of FIGS. 11 and 12, the sealing protrusion 114, 116 takes the form of a bump 129 extending directly and outwardly from the belt 31. The bump 129 may have a neck 131 which provides a reduced area proximate to the belt 31. The bump 129 extends continuously around the belt 31. The free end of the bump 129 forms a rubbing surface 129a. The overall height H3 of the sealing protrusions 114, 116 of the embodiments of FIGS. 11 and 12 is the same as the overall height H3 of the sealing protrusions 114, 116 of the embodiments of FIGS. 6-10. The bumps 129 can be compressed relative to the belt 31 such that the rubbing surface 129a flattens when it contacts a hard object. The bumps 129 may take a variety of shapes, such as triangular, square, rectangular, round, curved, polygonal.

In each of the embodiments of FIGS. 6-12, the sealing protrusions 114, 116 preferably have a uniform cross-section around the circumference of the belt 31.

In each of the embodiments of FIGS. 6-12, the sealing protrusions 114, 116 may be integrally formed with the belt 31, or the sealing protrusions 114, 116 may be formed separately from the belt 31 and attached to the belt 31 by suitable means, such as adhesive, epoxy, ultrasonic welding, heat-welding. Examples of suitable materials for the sealing protrusions 114, 116 if formed separately from the belt 31 include, but are not limited to nitrile, PVC, rubber, nylon, polyester, polyurethane, aramide, silicone, and copolyester. If the sealing protrusions 114, 116 are separately formed from the belt 31, the sealing protrusions 114, 116 do not need to be of the same material as the belt 31. In addition, the sealing protrusions 114, 116 do not need to be identical on each side of the belt 31. For example, the sealing protrusion shown in FIG. 9 can be provided on one side of the belt 31, and the sealing protrusion shown in FIG. 12 can be provided on the opposite side of the same belt 31.

Figure 13:
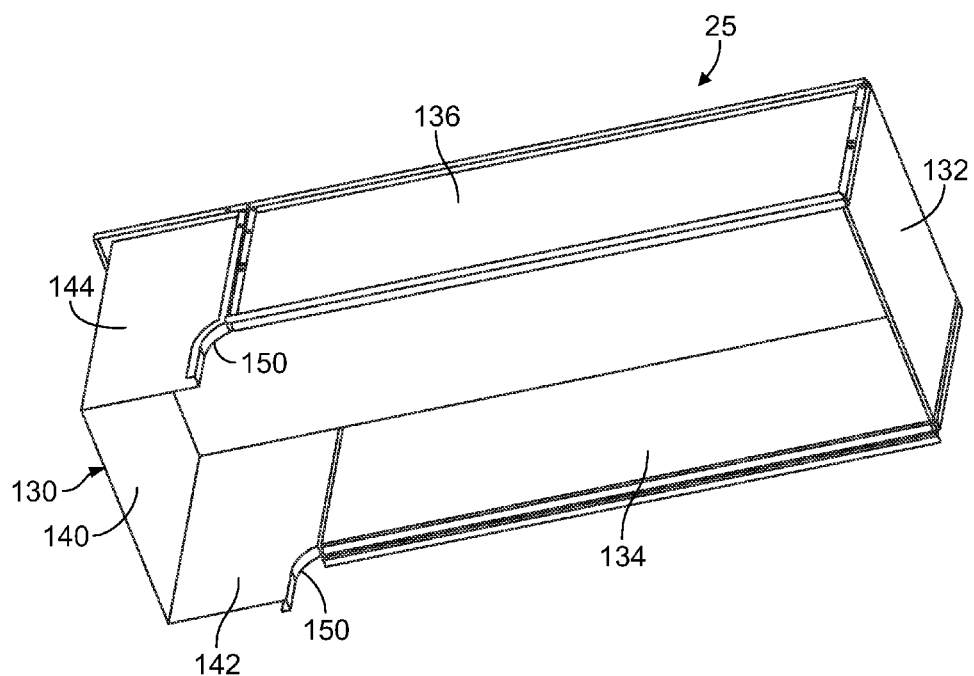
FIG. 13 is a bottom perspective view of the hopper.
Figure 14:
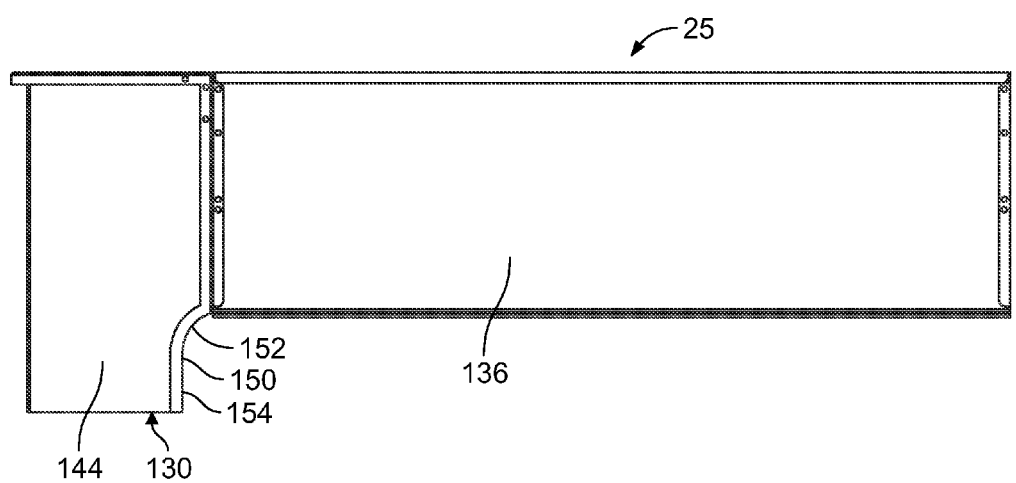
FIG. 14 is a side elevation view of the hopper.

As shown in FIGS. 13 and 14, the hopper 25 is conventional and includes a plurality of walls. The hopper 25 includes a front wall portion 130, a rear wall 132, a first side wall 134 connecting the front wall portion 130 to the rear wall 132, and a second side wall 136 connecting the front wall portion 130 to the rear wall 132. The hopper 25 may be formed of stainless steel for easy cleaning. The rear wall 132 may be movable relative to the side walls 134, 136. The side walls 134, 136 are movable relative to the front wall portion 130 and the rear wall 132.

The front wall portion 130 is formed of a front wall 140, a first side wall 142 extending from a side edge of the front wall 140, and a second side wall 144 extending from the opposite side edge of the front wall 140. The front wall 140 is generally rectangular. Each side wall 142, 144 is generally rectangular, having a front edge 142a, 144a connected to the front wall 140, an opposite rear edge 142b, 144b which is adjacent to a front edge of the respective side wall 134, 136, a top edge 146 and a bottom edge 148. A cutout 150 is provided in each side wall 142, 144 which extends from lower rear corner. Each cutout 150 forms a wall having an upper radiused portion 152, and a lower vertical portion 154.

Figure 15:
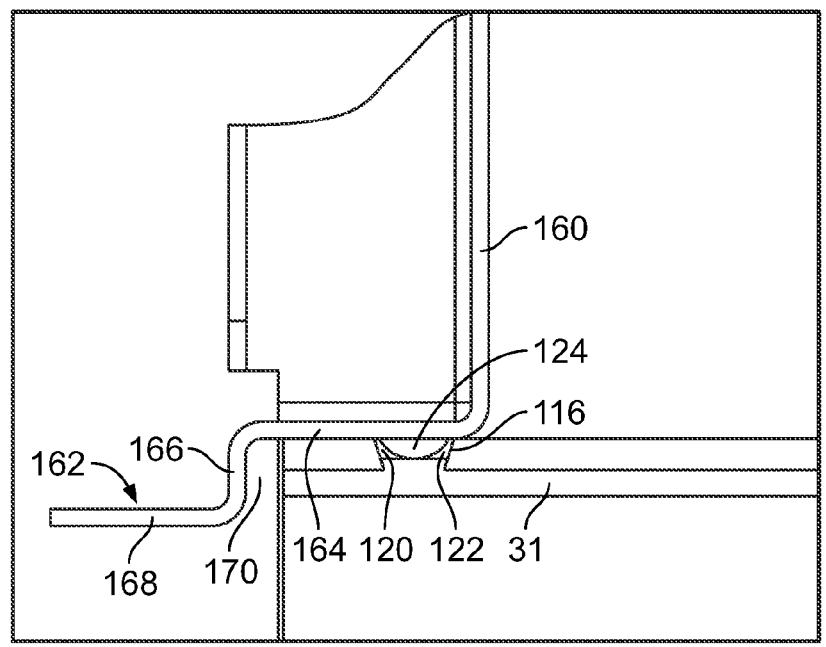
FIG. 15 is a cross-sectional views through a side wall of the hopper and through a portion of the conveyor belt.

As best shown in FIG. 15, each side wall 134, 136 has an elongated vertical main body 160 which has a flange 162 extending from a bottom end of the mail body 160. The main body 160 is preferably rectangular, having a top edge, a bottom edge, and inner and outer sides. Each flange 162 has a horizontal portion 164 which is attached to the bottom edge of the respective side wall 134, 136 and extends along the width of the side wall 134, 136, a vertical portion 166 which extends downwardly from an outer edge of the first horizontal portion 164, and a horizontal portion 168 which extends outwardly from a lower edge of the vertical portion 166. The first horizontal portion 164 and the vertical portion 166 define a recess 170, with a lower surface of the first horizontal portion 168 forming an upper edge of the recess 170, and the vertical portion 166 forming a side edge of the recess 170.

The rear wall 132 is preferably rectangular, and is connected to the side walls 134, 136.

Figure 3:
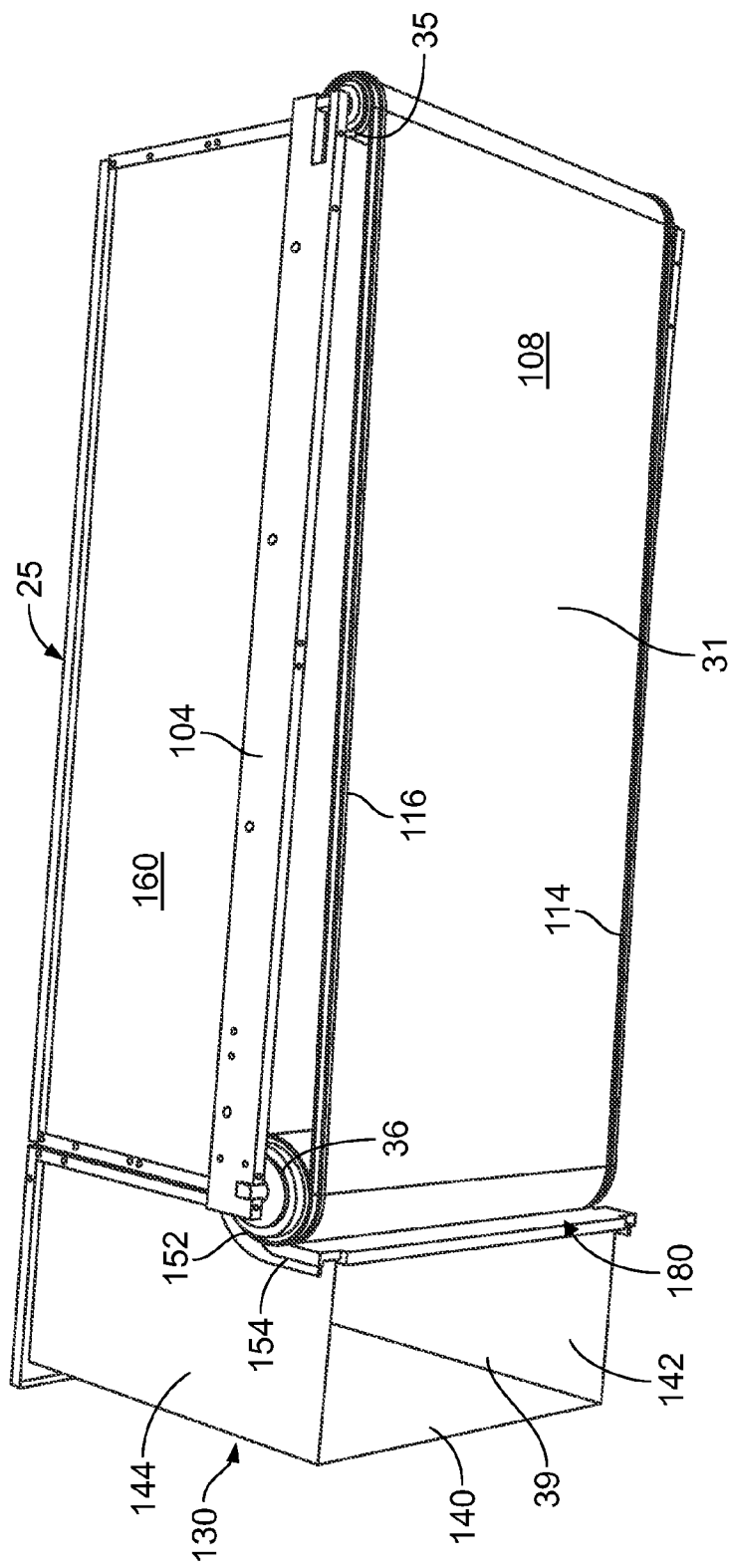
FIG. 3 is a bottom perspective view of a hopper and conveyor belt assembly of the food patty forming machine.

As best shown in FIG. 3, the belt assembly 100 is attached to the hopper 25 by the frames 102, 104. The ends of the frames 102, 104 are secured to the side walls 142, 144 of the front wall portion 130 and to the rear wall 132. The rollers 35, 36 and the belt 31 extend between the frames 102, 104 and form the floor of the hopper 25. The drive roller 36 and the portion of the belt 31 extending therearound seat within the radiused portion 152 of the cutout 150 and extend downwardly and partially overlap the vertical portion 154 of the cutout 150. The idler roller 35 is proximate to the rear wall 132 of the hopper 25. The drive roller 36 defines a radius R1. The radiused portion 152 of the cutout 150 defines a radius R2 which is generally equal to, but slightly larger than, a radius R3 which is defined by the radius R1 of the roller 36 and the height H1 of the belt 31. The radius R1 of the roller 36, the height H1 of the belt 31, and the height H3 of the respective sealing protrusion 114, 116 defines a radius R4. Radius R4 is greater than radii R2 and R3. As a result, when the sealing protrusions 114, 116 pass between the cutouts 150 and the roller 36, the sealing protrusion 114, 116 flex to conform to the shape of the radiused wall portion 152 and form a seal with the wall portion 152.

The belt 31 moves the food material 38 longitudinally along the bottom of the hopper 25 toward the other components of the molding machine 20. The belt 31 spans completely across the bottom of hopper 25, and under the side walls 134, 136 of the hopper 25. The sealing protrusions 114, 116 align with the horizontal portions 164 of the flanges 162 of the side walls 134, 136 and with the walls 152 forming the cutouts 150. As the belt 31 passes around roller 36, the sealing protrusions 114, 116 are sandwiched between the walls 152 forming the cutouts 150 and the belt 31 and the rubbing ends 120a, 122a engage with the respective walls 152. Upon engagement of the rubbing ends 120a, 122a with the walls 152, the legs 120, 122 of the sealing protrusions 114, 116 flex relative to the respective base 118 such that the legs 120, 122 flatten against the walls 152. This forms a seal between the belt 31 and the hopper 25 to prevent food material leakage between the front wall portion 130 of the hopper 25 and the belt 31.

As shown in FIG. 3, a wiper bar 180 is attached to the vertical portion 154 of each cutout 150 below the roller 36. As such the wiper bar 180 and the front wall portion 130 of the hopper 25 form a pump feed opening 39 which allows the food material 38 to pass from the belt 31 into the 28. The wiper bar 180 is used to scrape any food material 38 off of the belt 31 as the belt 31 passes around the roller 36 and between the roller 36 and the wiper bar 180. Food material 38 scraped off of the belt 31 by the wiper bar 180 falls through the pump feed opening 39 and into the manifold 27 of the food pump system 26.

Figure 16:
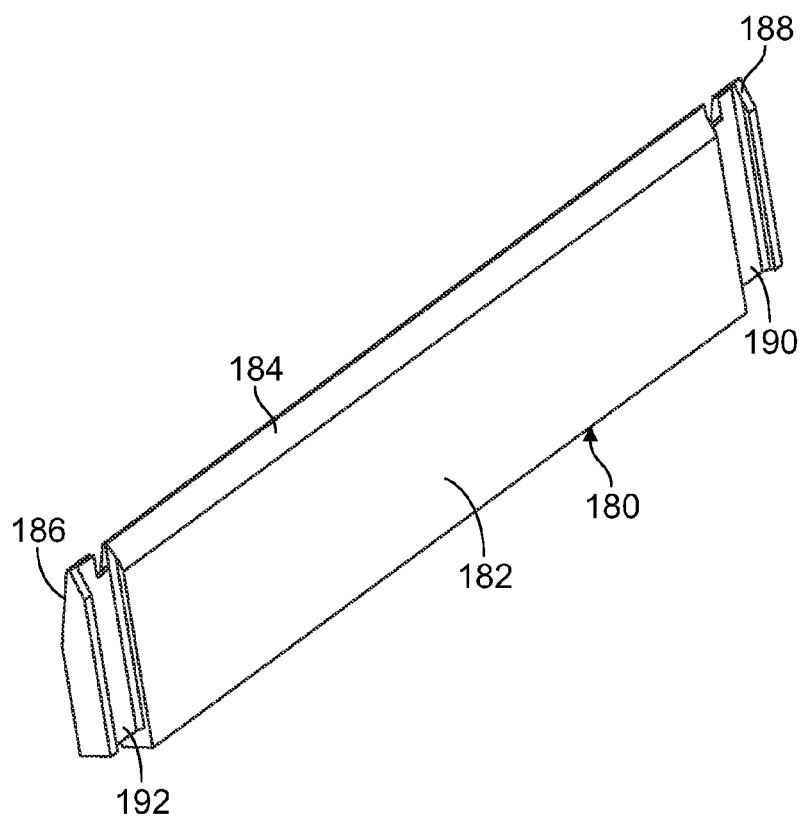
FIG. 16 is a top perspective view of a wiper bar used in the food patty forming machine.
Figure 17:
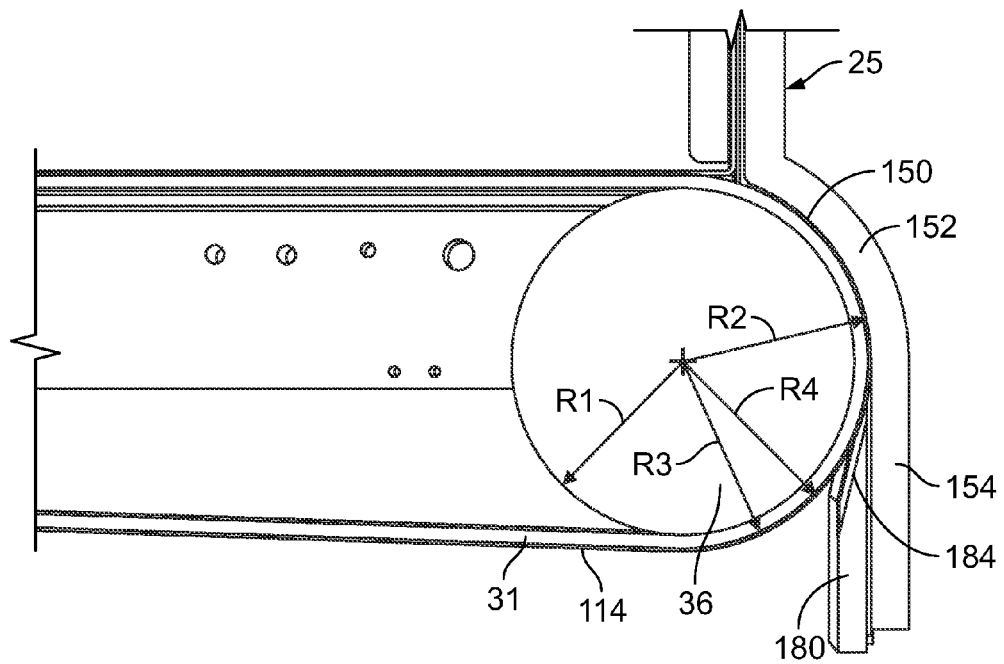
FIGS. 17 and 18 are alternate cross-sectional views through a side wall of the hopper and through a portion of the conveyor belt.
Figure 18:
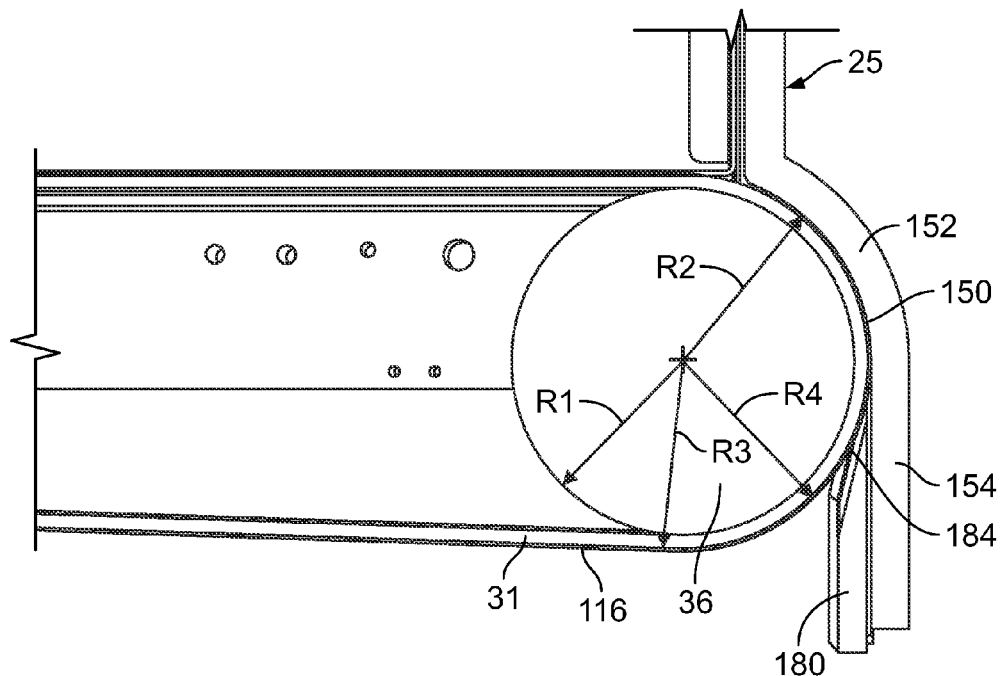

As best show in FIG. 16, the wiper bar 180 is elongated having a rectangular lower portion 182, an upper portion 184 having tapered front and rear surfaces extending upwardly from the lower portion 182, and a sealing protrusion receiving portion 186, 188 extending from each end thereof. The tapered rear surface of the upper portion 184 engages against the belt 31 as the belt 31 passes around the roller 36. Each sealing protrusion receiving portion 186, 188 has a recess 190, 192 therein which extends from an upper end of the sealing protrusion receiving portion 186, 188 to the lower end thereof. The recesses 190, 192 align with the sealing protrusions 114, 116 and as the belt 31 passes between the roller 36 and the wiper 180, the sealing protrusions 114, 116 passes through the recesses 190, 192. This prevents damage to the sealing protrusions 114.

The sealing protrusions 114, 116 are sandwiched between the horizontal portions 164 of the side walls 134, 136 and the belt 31 as the belt 31 moves along the bottom of the hopper 25. To avoid crushing the sealing protrusions 114, 116, each side wall 134, 136 is adjustable upwardly and downwardly relative to the front wall portion 130 and the rear wall 132 of the hopper 25, and thus each side wall 134, 136 is adjustable upwardly and downwardly relative to the belt 31. Such methods for adjusting the side walls 134, 136 is known in the art. For example, eccentric cams (not shown) can be provided on the conveyor frames 102, 104 which position can be rotationally adjusted relative to the conveyor frames 102, 104. As a result, the position of the side walls 134, 136 can be adjusted relative to the sealing protrusions 114, 116 so that the rubbing ends 120a, 122a of the sealing protrusions 114, 116 engage with the horizontal portions 164 of the side walls 134, 136 to form seals (by the legs 120, 122 flexing outwardly relative to the base 118), but the sealing protrusions 114, 116 are not crushed by the side walls 134, 136. This forms a seal between the hopper 25 and the belt 31 to prevent food material leakage between the sides of the hopper 25 and the belt 31.

In the operation of the machine 20, a supply of ground meat or other moldable food material 38 is dumped into the hopper 25 from overhead onto the belt 31. The hopper 25 can hold a large supply of moldable food material (800 to 1000 lbs.). The belt 31 moves the food material longitudinally of the hopper 25 toward the other components of the food pump system 26. At the forward end of hopper 25, the food material 38 is fed from the belt 31 downwardly through the pump feed opening 39 into the intake of the food pump system 26, and the food material 39 thereafter passes into the molding mechanism 28 to form the molded products.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

What is claimed is:

1. A combination comprising:
a conveyor belt comprising a loop of material having opposite first and second side edges, and which when laid flat has opposite planar surfaces extending between the first and second side edges, and first and second sealing protrusions positioned between the first and second side edges and extending outwardly from the outer surface of the loop of material, the first and second sealing protrusions extending continuously around the outer surface of the loop of material, the first and second sealing protrusions not being detachable from the loop of material; and
a hopper configured to hold material to be deposited onto the conveyor belt, the hopper being positioned above the conveyor belt, the hopper including first and second side walls,
wherein during use, the first sealing protrusion directly contacts the first side wall of the hopper and deforms between the loop of material and the first side wall of the hopper upon contact thereby forming a seal with the first side wall of the hopper, and the second sealing protrusion directly contacts the second side wall of the hopper and deforms between the loop of material and the second side wall of the hopper upon contact thereby forming a seal with the second side wall of the hopper.

2. The combination of claim 1, wherein the loop of material has a width, and each sealing protrusion has a width which is substantially less than the width of the loop of material.

3. The combination of claim 2, wherein the first sealing protrusion is proximate to, but spaced from the first side edge of the loop of material, and the second sealing protrusion is proximate to, but spaced from the second side edge of the loop of material.

4. The combination of claim 1, wherein at least one of the sealing protrusions is formed from a base extending from the loop of material, and a pair of spaced apart flexible legs extending from the base, the base and the legs forming a recess.

5. The combination of claim 4, wherein the legs are angled relative to each other.

6. The combination of claim 5, wherein the recess is radiused.

7. The combination of claim 5, wherein the recess is trapezoidal.

8. The combination of claim 1, wherein at least one of the sealing protrusions is formed from a pair of spaced apart flexible legs extending from the loop of material, the loop of material and the legs forming a recess.

9. The combination of claim 8, wherein the legs are angled relative to each other.

10. The combination of claim 9, wherein the recess is radiused.

11. The combination of claim 9, wherein the recess is trapezoidal.

12. The combination of claim 1, wherein at least one of the sealing protrusions is formed from a compressible bump extending directly and outwardly from the loop of material.

13. The combination of claim 1, wherein the sealing protrusions are integrally formed with the loop of material.

14. The combination of claim 1, wherein the first and second sealing protrusions are separately formed from the loop of material, and attached thereto such that the first and second sealing protrusions are not detachable therefrom after being attached.

15. The combination of claim 1, wherein the first and second sealing protrusions are formed of one of nitrile, PVC, rubber, nylon, polyester, polyurethane, aramide, silicone, and copolyester.

16. The combination of claim 1, wherein the material is formed of one of nitrile, PVC, rubber, nylon, polyester, polyurethane, aramide, silicone, and copolyester.

17. The combination of claim 1, wherein the first sealing protrusion has a uniform cross-section along its length, and the second sealing protrusion has a uniform cross-section along its length.

18. The combination of claim 1, further comprising a wiper bar mounted on the hopper and configured to contact the outside surface of the loop of material, the wiper bar having recesses therein in which the first and second sealing protrusions pass through during use.

19. The combination of claim 1, further in combination with a food patty forming machine.

20. A combination comprising:
a conveyor belt comprising a loop of material having opposite first and second side edges, and which when laid flat has opposite planar surfaces extending between the first and second side edges, and first and second sealing protrusions extending outwardly from the outer surface of the loop of material, and extending continuously around the outer surface of the loop of material and not detachable from the loop of material, at least one of the first and second sealing protrusions is formed from a pair of spaced apart flexible legs extending from the loop of material, the loop of material and the legs forming a recess; and
a hopper configured to hold material to be deposited onto the conveyor belt, the hopper being positioned above the conveyor belt, the hopper including first and second side walls, wherein during use, the first sealing protrusion directly contacts the first side wall of the hopper and deforms between the loop of material and the first side wall of the hopper upon contact thereby forming a seal with the first side wall of the hopper, and the second sealing protrusion directly contacts the second side wall of the hopper and deforms between the loop of material and the second side wall of the hopper upon contact thereby forming a seal with the second side wall of the hopper.

21. The combination of claim 20, wherein at least one of the sealing protrusions further comprises a base between the loop of material and the legs, the base and the legs forming the recess.

22. The combination of claim 21, further in combination with a food patty forming machine.

23. The combination of claim 20, further in combination with a food patty forming machine.

24. A combination comprising:
a conveyor belt comprising a loop of material having opposite first and second side edges, and which when laid flat has opposite planar surfaces extending between the first and second side edges, and first and second sealing protrusions extending outwardly from the outer surface of the loop of material, and extending continuously around the outer surface of the loop of material and not detachable from the loop of material, at least one of the sealing protrusions is formed from a compressible bump extending directly and outwardly from the loop of material; and
a hopper configured to hold material to be deposited onto the conveyor belt, the hopper being positioned above the conveyor belt, the hopper including first and second side walls,
wherein during use, the first sealing protrusion directly contacts the first side wall of the hopper and deforms between the loop of material and the first side wall of the hopper upon contact thereby forming a seal with the first side wall of the hopper, and the second sealing protrusion directly contacts the second side wall of the hopper and deforms between the loop of material and the second side wall of the hopper upon contact thereby forming a seal with the second side wall of the hopper.

25. The combination of claim 24, further in combination with a food patty forming machine.

* * * * *